United States Patent [19]
Sayama et al.

[11] Patent Number: 6,063,258
[45] Date of Patent: *May 16, 2000

[54] PRODUCTION OF HYDROGEN FROM WATER USING PHOTOCATALYST-ELECTROLYSIS HYBRID SYSTEM

[75] Inventors: Kazuhiro Sayama; Hironori Arakawa; Kiyomi Okabe; Hitoshi Kusama, all of Tsukuba, Japan

[73] Assignee: Director-General of Agency of Industrial Science and Technology, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/028,495

[22] Filed: Feb. 24, 1998

[30] Foreign Application Priority Data

Nov. 27, 1997 [JP] Japan .................................. 9-325708

[51] Int. Cl.⁷ ....................................................... C25B 1/02
[52] U.S. Cl. .................... 205/637; 205/638; 204/157.15; 204/157.52
[58] Field of Search ................................. 205/637, 638; 204/157.15, 157.52; 422/186.3

[56] References Cited

U.S. PATENT DOCUMENTS

| | | | |
|---|---|---|---|
| 4,176,026 | 11/1979 | Harriman | 204/157.1 R |
| 4,389,288 | 6/1983 | Vaughan | 204/101 |
| 4,699,700 | 10/1987 | Dhooge | 204/105 R |
| 5,219,671 | 6/1993 | Parker et al. | 429/17 |
| 5,391,278 | 2/1995 | Honna et al. | 204/129 |

OTHER PUBLICATIONS

*Chemical Abstracts*, vol. 89, No. 12, Sep. 18, 1978, Shiro Yoshizawa et al, "Electrochemical Hydrogen Generator" JP 53–006116.

*Chemical Abstracts*, vol. 95, No. 22, Nov. 30, 1981, Takehara et al "Hydrogen Production by Hybrid Electrolysis Combined with Assistance of Solar Energy".

*Chemical Abstracts*, vol. 98, No. 18, May 2, 1983, Takehara et al "Hydrogen Production by Hybrid Process Combined with Assistance of Solar and Electric Energies.".

*Primary Examiner*—Kathryn Gorgos
*Assistant Examiner*—Wesley A. Nicolas
*Attorney, Agent, or Firm*—Lorusso & Loud

[57] ABSTRACT

A process for the production of a hydrogen gas from water, wherein comprising an aqueous solution containing ferric ions is irradiated with a light while maintaining the aqueous solution in contact with a photocatalyst to convert the ferric ions into ferrous ions. The resulting aqueous solution containing the ferrous ions is electrolyzed to yield a hydrogen gas.

10 Claims, 1 Drawing Sheet

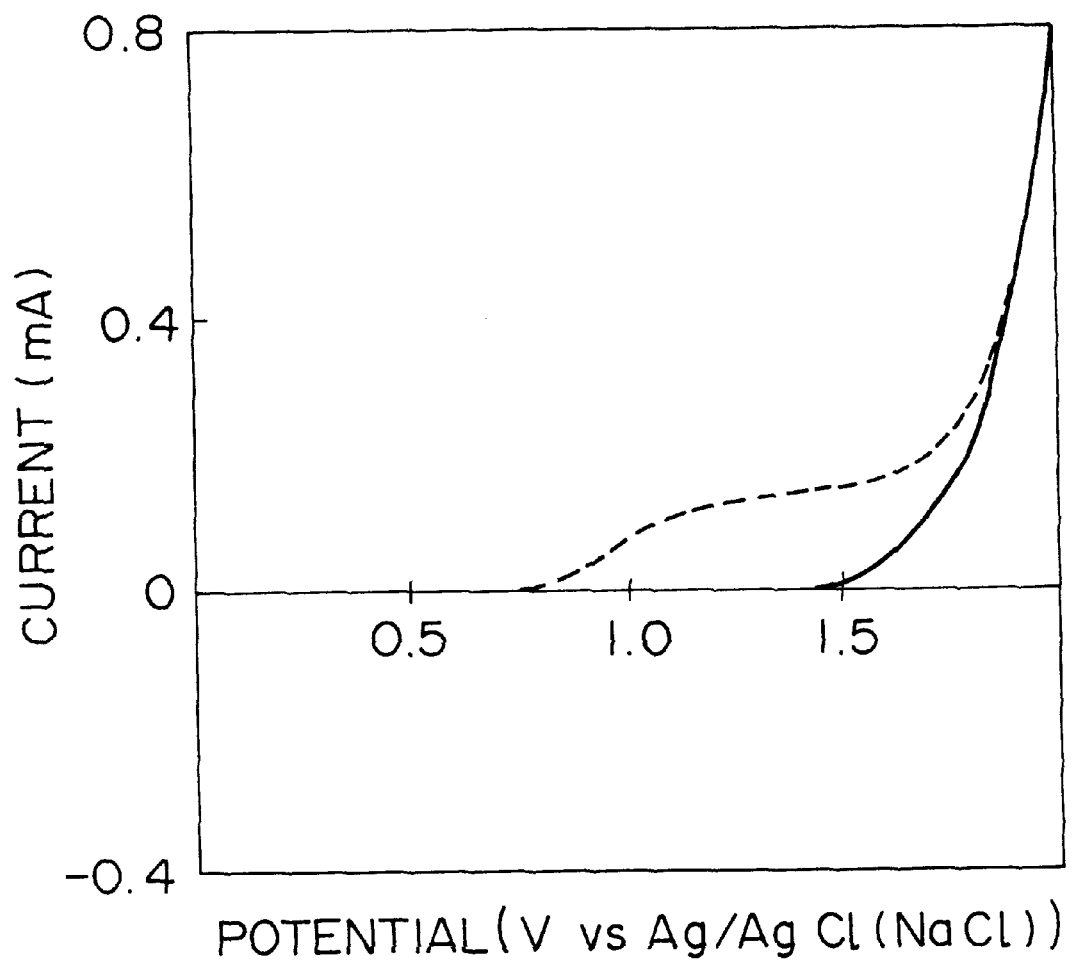

PRODUCTION OF HYDROGEN FROM WATER USING PHOTOCATALYST-ELECTROLYSIS HYBRID SYSTEM

BACKGROUND OF THE INVENTION

This invention relates to a process for the production of hydrogen gas from water.

Hydrogen is now expected to be an important energy source utilizable for batteries, fuels for engines, etc. One known method of producing hydrogen from water is catalytic decomposition of water into hydrogen and oxygen using sunlight and a photocatalyst. Since the photocatalyst used in the known method is active only in UV light, visible light of sunlight can not be utilized. A method is also known in which water is subjected to electrolysis to obtain hydrogen. In order to effectively produce electrolysis, however, it is necessary to use a higher bath voltage than the theoretical bath voltage of 1.23 V. Therefore, when a solar energy is utilized for the electrolysis, high performance solar batteries are needed. Short service life and high manufacturing and maintenance costs of such solar batteries make the conventional electrolysis method inapplicable in actual practice.

SUMMARY OF THE INVENTION

It is, therefore, an object of the present invention to provide a process which can produce hydrogen from water at reduced costs.

Another object of the present invention is to provide a process of the above-mentioned type which requires a reduced electrical energy in electrolysis of water.

It is a further object of the present invention to provide a process of the above-mentioned type which can effectively convert solar energy into hydrogen energy.

In accomplishing the above objects, there is provided in accordance with the present invention a process for the production of a hydrogen gas from water utilizing a hybrid system including a catalytic reaction using a photocatalyst and electrolysis. The process includes the steps of:

(a) irradiating an aqueous solution containing ferric ions with a light while maintaining the aqueous solution in contact with a photocatalyst to convert the ferric ions into ferrous ions; and (b) electrolyzing the ferrous ion containing aqueous solution obtained in step (a) to yield a hydrogen gas.

The reactions involved in the above steps (a) and (b) are respectively as follows:

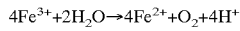  (a)

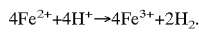  (b)

Thus, the overall reaction is:

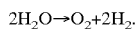

The process for the production of hydrogen from water according to the present invention includes the two steps of (a) energy accumulation by catalytic reduction of $Fe^{3+}$ into $Fe^{2+}$ ($\Delta G>0$) and (b) utilization of the accumulated chemical energy for the production of hydrogen by electrolysis with reduced electrical energy.

BRIEF DESCRIPTION OF THE DRAWING

Other objects, features and advantages of the present invention will become apparent from the detailed description of the preferred embodiments of the present invention which follows, when considered in light of the accompanying drawings, in which:

the sole FIGURE is a graph showing a relationship between the current and the electrode potential under electrolysis in Example 5 (dotted line) and Comparative Example 1.

DETAILED DESCRIPTION OF THE PREFERRED EMBODIMENTS OF THE INVENTION

Any photocatalyst may be used for the purpose of the present invention. The use of a semiconductor photocatalyst, especially a semiconductor photocatalyst having a band gap of not greater than 3.3 eV, is desirable for reasons of effective accumulation of energy. Most preferred photocatalysts are those which meet with all of the following criteria: (a) to have a band gap of not greater than 3.3 eV, (b) to have a conduction band potential higher than (as absolute value) the Redox level of Fe(III)/Fe(II), (c) to have a valence band potential lower than (as absolute value) the Redox level of $O_2/H_2O$, and (d) to be stable under the reaction conditions. Illustrative of suitable photocatalysts are $WO_3$, $TiO_2$, $SrTiO_3$, $Ta_2O_5$, $In_2O_5$, SiC and $FeTiO_x$ where x is a number of 3–3.5.

It is preferred that a mixture of two or more different photocatalysts be used for reasons of effective and efficient utilization of various wavelengths encompassing UV and visible regions. The photocatalyst is generally used in the form of particles to ensure a large surface area. Preferably, the particle diameter of the photocatalyst ranges from 1–2,000 nm, more preferably 2–200 nm. To improve light exposing efficiency, it is also preferred that the photocatalyst be supported on carrier particles such as silica and zirconia. For the purpose of accelerating charge separation or reducing over voltage, the photocatalyst may be preferably composited with an additive such as $RuO_2$, $IrO_2$ or NiO in an amount of 0.01–20% by weight, preferably 0.1–5% by weight.

The kind of anions, pH and concentration of $Fe^{3+}$ of the aqueous solution have an influence upon the catalytic reaction of the above energy accumulating step. These conditions are suitably determined in view of the succeeding electrolysis step which is a reversible reaction between $Fe^{3+}$ and $Fe^{2+}$.

The energy accumulation step may be carried out in an outdoor pool using sunlight as a light source. Of course, the energy accumulation step may be performed using an artificial light source. In any case, it is recommended to perform the energy accumulation step under conditions which ensure a high light irradiation efficiency and a high catalyst-water contact efficiency.

The aqueous solution in which at least a part of the ferric ions have been converted into ferrous ions is then subjected to electrolysis to form a hydrogen gas.

The electrolysis is preferably performed using a a cell separated by a diaphragm, preferably a cation exchange membrane, into anode and cathode chambers. The cathode at which hydrogen is generated is preferably a material having a small hydrogen over voltage, such as a carbon electrode having a small amount of Pt or Ni supported thereof. The anode at which ferrous ions are oxidized to ferric ions may be the same material as that of the cathode or may be a carbon electrode without metals.

Because the light energy has been accumulated as chemical energy (ferrous ions), the electrolysis can be carried out with a lower electrolysis bath voltage (e.g. 1 V or less) than that used in the conventional electrolysis (about 2 V). Thus, as an electric energy source, an ordinary solar battery may be used. To improve electrolysis efficiency, various measures can be adopted such as to stir the bath near the anode, to increase the bath temperature, to continuously feed the ferrous ion containing aqueous solution, to use a current collecting material, to decrease the electrode current density and to reduce the distance between the electrodes.

The following examples will further illustrate the present invention.

EXAMPLE 1

In a reactor equipped inside with a high pressure mercury lamp (400 V), a mixture containing 400 ml of water, 2 mmol of ferric sulfate and 1 g of $WO_3$ was charged. The space above the mixture in the reactor was replaced with argon and then evacuated so that the pressure in the reactor was maintained at about 35 torr. The mixture was then irradiated with the lamp with stirring, while measuring the amount of oxygen generated by gas chromatography. The average oxygen producing rate MA between 2 and 4 hours from the commencement of the irradiation was 40 $\mu$mol/hour, the cumulative amount MT of the oxygen produced up to 4 hours after the commencement of the irradiation was 270 $\mu$mol, and the ratio R of the amount of $Fe^{2+}$ to that of $Fe^{3+}$ at 4 hours after the commencement of the irradiation was 1.2:1. The irradiation was continued for 20 hours. Then, the mixture in the reactor was immediately filtered and the filtrate was placed in one of two chambers separated by an ion exchange membrane. The same amount of pure water was placed in the other chamber. An amount of sulfuric acid was then added to each chamber so that the $SO_4^{2-}$ concentration in the solution in each chamber was 0.5 mol/liter. A platinum wire was disposed in each chamber as an electrode. As a reference electrode, Ag/AgCl (NaCl) was used to measure the anode potential under electrolysis. The electrical potential between the anode and cathode was increased at a swept rate of 0.02 V/minute using a potentiostat. As a result, a current began flowing at an anode potential of 1.0 V(Ag/AgCl) with the simultaneous production of hydrogen gas.

COMPARATIVE EXAMPLE 1

A mixture containing 400 ml of water and 2 mmol of ferric sulfate was placed in one of two chambers separated by an ion exchange membrane. The same amount of pure water was placed in the other chamber. An amount of sulfuric acid was then added to each chamber so that the $SO_4^{2-}$ concentration in the solution in each chamber was 0.5 mol/liter. Electrolysis was then carried out in the same manner as that in Example 1. A current began flowing at an anode potential of 1.5 V(Ag/AgCl(NaCl)) with the simultaneous production of hydrogen gas. A current-potential relationship of the electrolysis is shown by the solid line in the FIGURE.

EXAMPLE 2

In a reactor equipped inside with a high pressure mercury lamp (400 V), a mixture containing 400 ml of water, 2 mmol of ferric sulfate, 1 g of $WO_3$ and an amount of sulfuric acid providing a $SO_4^{2-}$ concentration of 0.5 mol/liter was charged. The mixture was then irradiated with the lamp in the same manner as that in Example 1. The average oxygen producing rate MA between 2 and 4 hours from the commencement of the irradiation was 40 $\mu$mol/hour, the cumulative amount MT of the oxygen produced up to 4 hours after the commencement of the irradiation was 260 $\mu$mol, and the ratio R of the amount of $Fe^{2+}$ to that of $Fe^{3+}$ at 4 hours after the commencement of the irradiation was 1.1:1. The irradiation was continued for 20 hours. Then, the mixture in the reactor was immediately filtered and the filtrate was placed in one of two chambers separated by an ion exchange membrane. The same amount of water having a $SO_4^{2-}$ concentration of 0.5 mol/liter was placed in the other chamber. Electrolysis was then carried out in the same manner as that in Example 1. A current began flowing at an anode potential of 1.0 V(Ag/AgCl) with the simultaneous production of hydrogen gas.

EXAMPLE 3

Example 1 was repeated in the same manner as described above except that ferric chloride was substituted for ferric sulfate and that hydrochloric acid was substituted for sulfuric acid. The average oxygen producing rate MA between 2 and 4 hours from the commencement of the irradiation was 20 $\mu$mol/hour, the cumulative amount MT of the oxygen produced up to 4 hours after the commencement of the irradiation was 250 $\mu$mol, and the ratio R of the amount of $Fe^{2+}$ to that of $Fe^{3+}$ at 4 hours after the commencement of the irradiation was 1.0:1. In the electrolysis, a current began flowing at an anode potential of 0.9 V(Ag/AgCl) with the simultaneous production of a hydrogen gas.

COMPARATIVE EXAMPLE 2

A mixture containing 400 ml of water and 2 mmol of ferric chloride placed in one of two chambers separated by an ion exchange membrane. The same amount of pure water was placed in the other chamber. An amount of hydrochloric acid was then added to each chamber so that the $Cl^-$ concentration in the solution in each chamber was 0.5 mol/liter.

Electrolysis was then carried out in the same manner as that in Example 1. A current began flowing at an anode potential of 1.3 V(Ag/AgCl(NaCl)) with the simultaneous production of hydrogen gas.

EXAMPLE 4

Example 1 was repeated in the same manner as described above except that $TiO_2$ (rutile) was substituted for $WO_3$. The average oxygen producing rate MA between 2 and 4 hours from the commencement of the irradiation was 20 $\mu$mol/hour, the cumulative amount MT of the oxygen produced up to 4 hours after the commencement of the irradiation was 260 $\mu$mol, and the ratio R of the amount of $Fe^{2+}$ to that of $Fe^{3+}$ at 4 hours after the commencement of the irradiation was 1.1:1. In the electrolysis, a current began flowing at an anode potential of 1.0 V(Ag/AgCl) with the simultaneous production of a hydrogen gas.

EXAMPLE 5

Particles of $WO_3$ were impregnated with an aqueous solution containing $RuCl_3$ and then calcined at 500° C. for 2 hours in air to produce four kinds of $WO_3$—$RuO_2$ Composites (I)–(IV) having $RuO_2$ contents of 0.3, 1, 3 and 5% by weight, respectively.

Example 1 was then repeated in the same manner as described except that each of $WO_3$—$RuO_2$ Composites (I)–(IV) was substituted for $WO_3$. The average oxygen producing rate MA between 2 and 4 hours from the commencement of the irradiation was 120 $\mu$mol/hour in the case of Composite (I), 190 $\mu$mol/hour in the case of Composite (II), 180 $\mu$mol/hour in the case of Composite (III) and 120 $\mu$mol/hour in the case of Composite (IV). The cumulative amount MT of the oxygen produced up to 4 hours after the commencement of the irradiation was 380 $\mu$mol in the case of Composite (I), 410 $\mu$mol in the case of Composite (II), 440 $\mu$mol in the case of Composite (III) and 400 $\mu$mol in the case of Composite (IV). The ratio R of the amount of $Fe^{2+}$ to that of $Fe^{3+}$ at 4 hours after the commencement of the irradiation was 3.2:1 in the case of Composite (I), 4.6:1 in the case of Composite (II), 7.3:1 in the case of Composite (III) and 4.0:1 in the case of Composite (IV). In the case of Composite (III), a current was found to begin flowing at an anode potential of 0.85 V(Ag/AgCl(NaCl)) with the simultaneous production of hydrogen gas. A current-potential relationship of the electrolysis is shown by the dotted line in the FIGURE.

EXAMPLE 6

Particles of $WO_3$ were impregnated with an aqueous solution containing $RuCl_3$ and then calcined for 2 hours in air at three different temperatures of 300° C., 400° C. and 600° C. to produce three kinds of $WO_3$—RuO! Composites (V)–(VII), respectively, each having a $RuO_2$ content of 3% by weight.

Example 5 was then repeated in the same manner as previously described using Composites (V)–(VII). The average oxygen producing rate MA between 2 and 4 hours from the commencement of the irradiation was 90 µmol/hour in the case of Composite (V), 90 µmol/hour in the case of Composite (VI) and 80 µmol/hour in the case of Composite (VII). The cumulative amount MT of the oxygen produced up to 4 hours after the commencement of the irradiation was 340 µmol in the case of Composite (V), 380 µmol in the case of Composite (VI) and 320 µmol in the case of Composite (VII). The ratio R of the amount of $Fe^{2+}$ to that of $Fe^{3+}$ at 4 hours after the commencement of the irradiation was 2.1:1 in the case of Composite (V), 3.2:1 in the case of Composite (VI) and 1.8:1 in the case of Composite (VII).

EXAMPLE 7

Particles of $TiO_2$ were impregnated with an aqueous solution containing ammonium tungstate and then calcined in air at 500° C. to produce a $WO_3$—$TiO_2$ Composite having a $WO_3$ content of 10% by weight.

Example 1 was then repeated in the same manner as described except that the $WO_3$—$TiO_2$ Composite was substituted for $WO_3$. The average oxygen producing rate MA between 2 and 4 hours from the commencement of the irradiation was 70 µmol/hour, the cumulative amount MT of the oxygen produced up to 4 hours after the commencement of the irradiation was 400 µmol, and the ratio R of the amount of $Fe^{2+}$ to that of $Fe^{3+}$ at 4 hours after the commencement of the irradiation was 4.0:1.

The above results are also summarized in Table below.

TABLE

| Example No. | Photo-catalyst | MA*1 µmol/hour | MT*2 µmol | R*3 | Potential V*4 |
|---|---|---|---|---|---|
| 1 | $WO_3$ | 40 | 270 | 1.2 | 1.0 |
| 2 | $WO_3$ | 40 | 260 | 1.1 | 1.0 |
| 3 | $WO_3$ | 20 | 250 | 1.0 | 0.9 |
| 4 | $TiO_2$ | 20 | 260 | 1.1 | 1.0 |
| 5 | $RuO_2$ (0.3 wt %) —$WO_3$ | 120 | 380 | 3.2 | — |
|   | $RuO_2$ (1 wt %) —$WO_3$ | 190 | 410 | 4.6 | — |
|   | $RuO_2$ (3 wt %) —$WO_3$ | 180 | 440 | 7.3 | 0.85 |
|   | $RuO_2$ (5 wt %) —$WO_3$ | 120 | 400 | 4.0 | — |
| 6 | $RuO_2$ (3 wt %) —$WO_3$ | | | | |
|   | (calcined: 300° C.) | 90 | 340 | 2.1 | — |
|   | (calcined: 400° C.) | 90 | 380 | 3.2 | — |
|   | (calcined: 500° C.) | 180 | 440 | 7.3 | 0.85 |
|   | (calcined: 600° C.) | 80 | 320 | 1.8 | — |
| 7 | $WO_3$ (10 wt %) —$TiO_3$ | 70 | 400 | 4.0 | — |

*1:MA: average oxygen producing rate between 2 and 4 hours from the commencement of the irradiation (µmol/hour)
*2:MT: cumulative amount of the oxygen produced up to 4 hours after the commencement of the irradiation (µmol)
*3:R: ratio of the amount of $Fe^{2+}$ to that of $Fe^{3+}$ at 4 hours after the commencement of the irradiation
*4:voltage relative to Ag/AgCl(NaCl) reference electrode The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A process for the production of hydrogen gas from water, comprising the steps of:

(a) irradiating an aqueous solution containing ferric ions with a light while maintaining said aqueous solution in contact with a semiconductor photocatalyst to reduce said ferric ions to ferrous ions on said photocatalyst; and (b) electrolyzing said aqueous solution containing said ferrous ions to yield a hydrogen gas.

2. A process as set forth in claim 1, wherein said semiconductor photocatalyst is selected from the group consisting of $WO_3$, $TiO_2$, $SrTiO_3$, $Ta_2O_5$, $In_2O_5$, SiC and $FeTiO_x$ where X is a number of 3–3.5.

3. A process as set forth in claim 1, wherein said photocatalyst is in the form of particles.

4. A process as set forth in claim 1, wherein said photocatalyst is supported on carrier particles.

5. A process as set forth in claim 1, wherein said photocatalyst is composited with a metal oxide selected from the group consisting of $RuO_2$, $IrO_2$ and NiO.

6. A process as set forth in claim 1, wherein said light is sunlight.

7. A process as set forth in claim 1, wherein said photocatalyst is dispersed in said aqueous solution in step (a).

8. A process as set forth in claim 1, wherein said photocatalyst is separated from said ferrous ion containing aqueous solution before step (b).

9. A process as set forth in claim 1, wherein step (b) is performed in a cell separated by a diaphragm into anode and cathode chambers.

10. A process for producing hydrogen gas from water using a solar energy, comprising the steps of:

(a) irradiating a pool of a mixture of a semiconductor photocatalyst and an aqueous solution containing ferric ions with sunlight to convert said ferric ions to ferrous ions on said photocatalyst;

(b) introducing a portion of said aqueous solution containing said ferrous ions obtained in step (a) into an electrolysis zone having an anode and a cathode electrically connected to positive and negative poles, respectively, of a solar battery to electrolyze said ferrous ion containing aqueous solution and to yield a hydrogen gas with the simultaneous conversion of said ferrous ions into ferric ions;

(c) recovering said hydrogen gas obtained in step (b); and (d) recycling the ferric ion containing aqueous solution obtained in step (c) to said pool in step (a).

* * * * *